United States Patent
Curry et al.

(10) Patent No.: US 10,694,323 B2
(45) Date of Patent: Jun. 23, 2020

(54) PLATFORM FOR GEO-FENCE SOCIAL MEDIA

(71) Applicant: Hippware, Inc., Monrovia, CA (US)

(72) Inventors: Steve Curry, Monrovia, CA (US);
Beng Leong Tan, Bull Creek (AU)

(73) Assignee: Hippware, Inc., Monrovia, CA (US)

( * ) Notice: Subject to any disclaimer, the term of this patent is extended or adjusted under 35 U.S.C. 154(b) by 45 days.

(21) Appl. No.: 15/995,663

(22) Filed: Jun. 1, 2018

(65) Prior Publication Data
US 2018/0279077 A1    Sep. 27, 2018

Related U.S. Application Data

(63) Continuation of application No. 15/446,574, filed on Mar. 1, 2017, now Pat. No. 9,992,620.

(60) Provisional application No. 62/333,762, filed on May 9, 2016.

(51) Int. Cl.
| | |
|---|---|
| *H04W 4/021* | (2018.01) |
| *H04W 4/21* | (2018.01) |
| *H04W 4/12* | (2009.01) |
| *H04W 4/18* | (2009.01) |
| *H04L 29/08* | (2006.01) |

(52) U.S. Cl.
CPC ............ *H04W 4/022* (2013.01); *H04L 67/02* (2013.01); *H04W 4/12* (2013.01); *H04W 4/185* (2013.01); *H04W 4/21* (2018.02)

(58) Field of Classification Search
None
See application file for complete search history.

(56) References Cited

U.S. PATENT DOCUMENTS

| | | | |
|---|---|---|---|
| 9,294,876 B2 | 3/2016 | Hulls et al. | |
| 9,330,053 B1 * | 5/2016 | Bertz | G06F 15/17306 |
| 9,560,481 B1 | 1/2017 | Yocam | |
| 2007/0015520 A1 * | 1/2007 | Casey | G01C 21/20 |
| | | | 455/456.3 |
| 2012/0172027 A1 * | 7/2012 | Partheesh | H04W 4/021 |
| | | | 455/420 |
| 2013/0030931 A1 * | 1/2013 | Moshfeghi | G01S 19/48 |
| | | | 705/16 |
| 2013/0143586 A1 | 6/2013 | Williams et al. | |
| 2014/0274118 A1 * | 9/2014 | Carmel | H04W 4/021 |
| | | | 455/456.1 |
| 2015/0011237 A1 | 1/2015 | Obermeyer et al. | |
| 2015/0095355 A1 | 4/2015 | Patton | |

(Continued)

FOREIGN PATENT DOCUMENTS

| | | |
|---|---|---|
| CN | 104160728 A | 11/2014 |
| KR | 20140089537 A | 7/2014 |

(Continued)

*Primary Examiner* — Ajit Patel
(74) *Attorney, Agent, or Firm* — Perkins Coie LLP; Michael Glenn

(57) ABSTRACT

A social media application that integrates with a map application which enables users to interact with both stationary and mobile geo-fences that are placed around locations or objects of interest. The geo-fences are populated with content or programmed to provide notifications, and social features. The social features include, among other things, categorization, peer review, interest suggestion, threshold alerts, private and public messaging, private and public content dissemination, and cloud repository.

23 Claims, 10 Drawing Sheets

(56) References Cited

U.S. PATENT DOCUMENTS

| | | |
|---|---|---|
| 2015/0163630 A1 | 6/2015 | Hughes, Jr. |
| 2015/0181016 A1 | 6/2015 | Jain et al. |
| 2015/0186943 A1 | 7/2015 | Seo et al. |
| 2015/0237475 A1 | 8/2015 | Henson et al. |
| 2015/0319568 A1 | 11/2015 | Haro et al. |
| 2015/0327015 A1 | 11/2015 | Stiner et al. |
| 2015/0341747 A1* | 11/2015 | Barrand ............. G06Q 30/0201 455/405 |
| 2016/0005077 A1 | 1/2016 | McDevitt |
| 2016/0007151 A1 | 1/2016 | Birch et al. |
| 2016/0088546 A1 | 3/2016 | Birch et al. |
| 2016/0094944 A1 | 3/2016 | Chinnakonda et al. |
| 2016/0345171 A1 | 11/2016 | Kulkarni et al. |
| 2017/0019777 A1* | 1/2017 | Cole, Jr. ................. H04W 4/02 |
| 2018/0198755 A1* | 7/2018 | Domangue ............. H04L 63/02 |

FOREIGN PATENT DOCUMENTS

| | | |
|---|---|---|
| KR | 20160018838 A | 2/2016 |
| WO | 2015084678 A1 | 6/2015 |

\* cited by examiner

PLATFORM FOR GEO-FENCE SOCIAL MEDIA

CROSS-REFERENCE TO RELATED APPLICATION(S)

This application is a continuation of U.S. non-provisional application Ser. No. 15/446,574, filed Mar. 1, 2017, now U.S. Pat. No. 9,992,620, which claims benefit of U.S. provisional application No. 62/333,762, filed May 9, 2016, the entirety of each application is incorporated herein by this reference thereto.

TECHNICAL FIELD

Teachings relate to social media. More particularly, teachings relate to social media applications as applied and organized by a plurality of geo-fences.

BACKGROUND

Social media are computer-mediated tools that allow people or companies to create, share, or exchange information of general interest. Furthermore, social media depend on mobile and web-based technologies to create highly interactive platforms through which individuals and communities share, co-create, discuss, and modify user-generated content.

Geo-fencing is the practice of using global positioning (GPS), radio frequency identification (RFID) or cellular networks to define a geographic boundary. Then, once this "virtual barrier" is established, an administrator or user can set up triggers that send a text message, email alert, or app notification when a mobile device enters (or exits) the specified area.

DETAILED DESCRIPTION

A social media application that integrates with a map application which enables the creation of content corrals defined at least by geo-fences ("content fence") is disclosed. Users generate content fences on maps or in reference to mapped objects which are populated by user-generated content and then are subject to a number of social features. The social features include, among other things, categorization, peer review, interest suggestion, threshold alerts, private and public messaging, private and public content dissemination, and cloud repository.

Placement of content fences is related to a map application. Embodiments of the map application include those which are fully integrated maps in the social media application, plugin maps, and API map applications. User's select an area on the map or an object which is searchable through the map application for which to attach a content fence. Alternatively, a map searchable object is sent to the user via direct messages wherein the user may attach a content fence to the object via the direct message. The social media application includes user interface features that enable the user to adjust the size and character of the content fence. One example of the character of a content fence is a photo repository, for photographs taken within the content fence. Other examples are detailed below.

Figure 1:
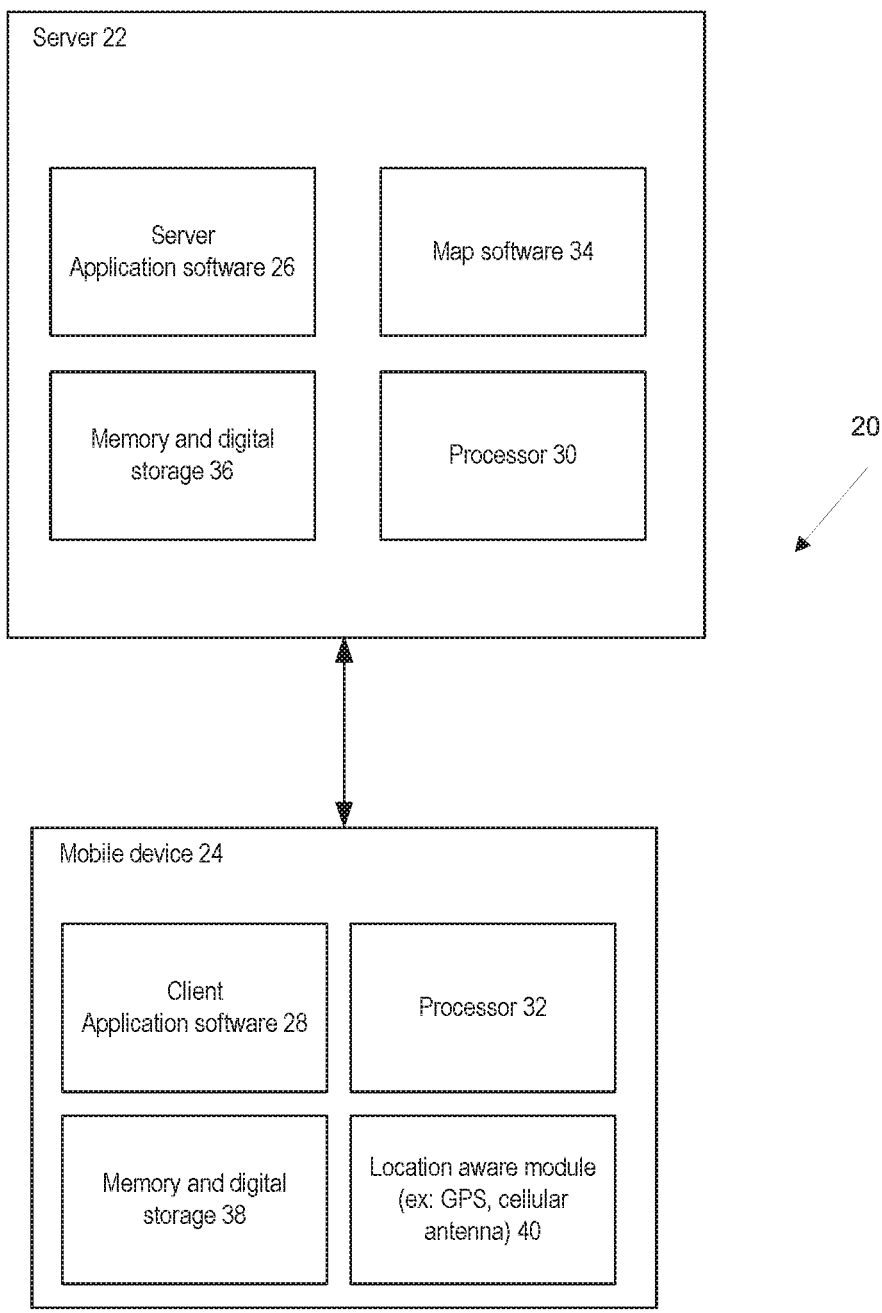
FIG. 1 is a block diagram illustrating a social media network according to various embodiments.

FIG. 1 is a block diagram illustrating a social media network system 20 according to various embodiments. In some embodiments a content fence application is operated both on a server side and mobile device side. A processor operated server 22 and mobile devices 24 communicate directly with one another via the Internet. The server 22 includes server side application software 26 and the mobile device 24 includes client side application software 28. The server 22 and mobile device 24 each include a processor 30, 32

The server 22 optionally includes map software 34 which interfaces with both the server 22 and client side application software 28. The map software 34 can be fully integrated, a plugin program, a map API, or another suitable map program known in the art. Both the server 22 and the mobile device 24 include memory and digital storage 36, 38 used to run application software 26, 28. The mobile device 24 includes a location aware module 40. The location aware module tracks the location of the mobile device 24 and may include a GPS, cellular triangulation, WiFi triangulation, any combination of the previous, or other suitable means known in the art.

Figure 2:
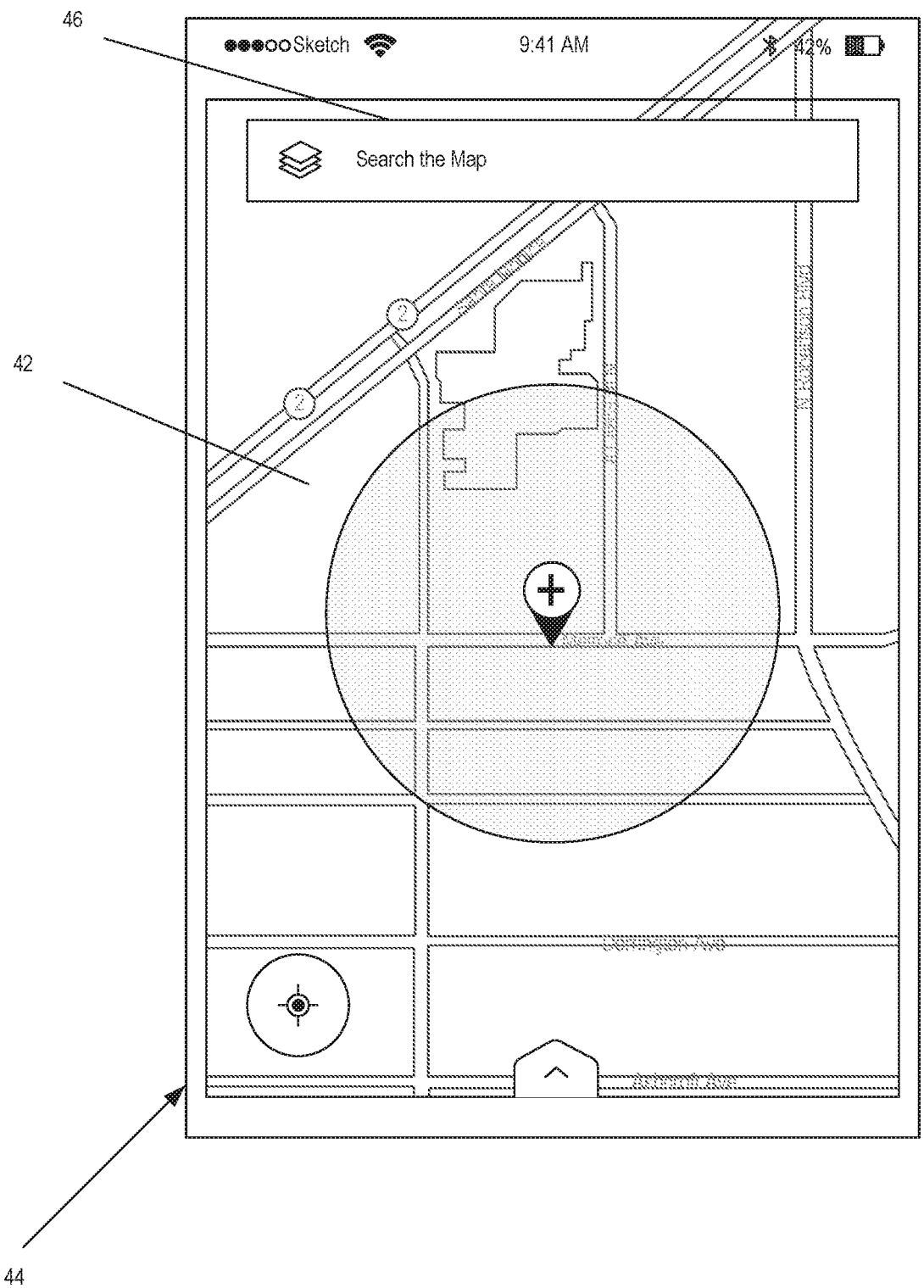
FIG. 2 is an illustration of a content fence represented on a map.

FIG. 2 is an illustration of a content fence 42 represented on a map 44. The figure includes a street map. The user may direct the application to adjust the view of the map 44. There is a search bar 46 to find particular addresses, locations, or general concepts such as "grocery store" or "gas station."

Placed on the map with a pin at its center is a content fence 42. Content fences 42 are defined by radii from a given point. Alternatively, content fences 42 may be defined as arbitrary polygons (such as polygons drawn by a user on a touchscreen depiction of a map 44). The point does not have to be fixed. In some embodiments the point may follow a mobile device 24, or another mobile object which broadcasts location signals. The circular boundary of the content fence 42 has effects for a set of users whom cross the boundary while carrying a mobile device 24. The exact nature of these effects depend on the settings and configuration of the content fence 42. In some cases, a user crossing in or out of the content fence 42 has no effect, whereas others may receive passive or active notifications. In this illustrative example, the map 44 displayed is of a segment of Hollywood, Calif., and the content fence 42 is centered around a particular wall mural.

Figure 3:
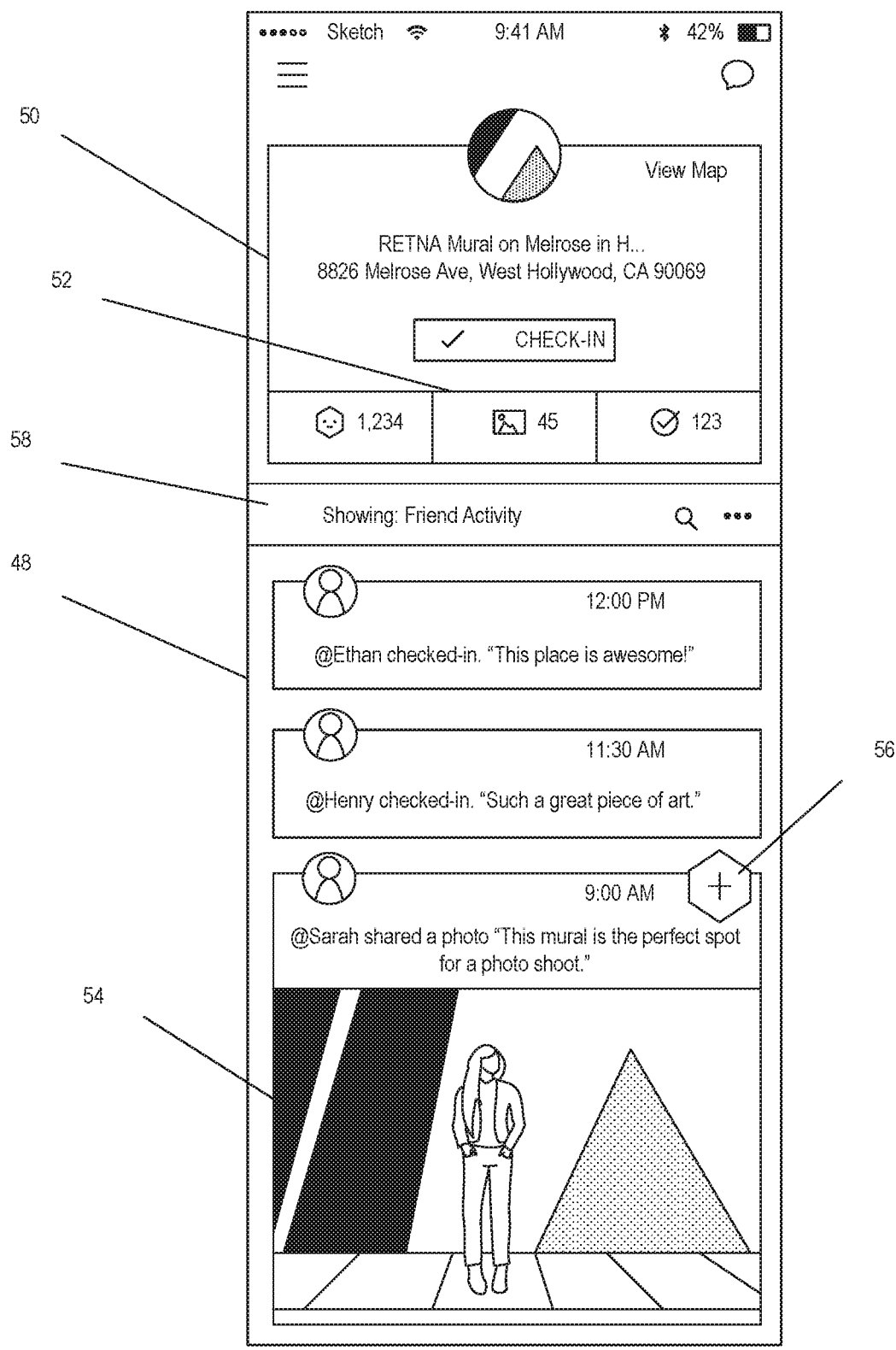
FIG. 3 is an illustration of a content feed associated with a content fence.

FIG. 3 is an illustration of a content feed associated with a content fence 42. Content fences 42 include posted content. When activated, a content fence 42 displays contents to a user. Shown in FIG. 3 as an illustrative example is the activated content fence 42 of FIG. 2, a content fence 42 centered around a painted mural in Hollywood, Calif. When activated, users view a content fence feed 48.

The content fence feed 48 includes a number of elements. The content fence feed 48 includes a content fence title 50 that displays information about the particular content fence 42 and/or a channel that the content fence 42 belongs to. There are additionally a number of social controls 52 such as "check-ins" and statistics for users whom interact with the content fence 42.

Below the content fence title 50, there are content posts 54. Content posts 54 are user generated entries of multimedia files such as text, images, video, audio, and other known user post types in the art. The content posts 54 are arranged in a live feed style which can be sorted a number of ways (e.g. chronological, by type, by category, by tags, etc.). Those users who activate the content fence 42 are enabled to generate content posts 54 by activating a post button 56. Additionally, the content fence feed 48 includes a sorting menu 58 where users are enabled to sort the content posts 54. Sorting options include displaying content posts 54 only for those users who have indicated they are friends with one another, displaying all content posts 54, displaying highly rated or recent content posts 54, or any other suitable sorting metric known in the art.

Some content fences 42 may be configured to enforce the requirement that users must activate the content fence 42 prior to posting while others may allow posting from anyone, regardless of whether they have activated the content fence 42 or not.

Displayed in the content fence feed 48 as an example is a picture of a user in front of the mural for which the content fence 42 is based around. In order to protect the concept of keeping content posts related to the content fence and the items in the physical world found therein, an aggregate user rating system is implemented. Users are enabled to down vote content posts as not being relevant. After receiving a predetermined number of "irrelevant" or "inappropriate" votes content posts 54 are removed from the content fence 42. In this way, the content fence is protected from hosting images that do not pertain to the content fence 42. In the pictured example, a hamburger restaurant would not be relevant to the Hollywood wall mural.

In this example, the mural content fence 42 is a public content fence which users see merely by looking at the map where the content fence resides. In some embodiments, content fences are only visible to users who are members of channels to which a content fence 42 or group of content fences 42 are associated with.

Other functions available to users located inside of content fences 42 include direct messaging or payment authorization. With respect to direct messaging, users who have access to a given content fence 42 (i.e. are included in the user list who may view and interact with the content fence) may send direct messages to one another while inside the content fence 42. The direct messages also include group messaging.

With respect to payment authorization, content fences 42 may interact with payment processing software (e.g., PayPal, Visa, Bitcoin, etc. . . . ). In some embodiments, where users organize a transaction, the content fence 42 provides authorization for that transaction. For example, payment processing will not complete unless both users party to a transaction have devices located inside the content fence 42. This helps reduce credit card fraud by verifying that the seller in the transaction is in proximity to the buyer similar to how transactions are verified by a user physically holding a credit card at a credit card machine, digital payment processing is verified via location of the user's mobile device 26.

Figure 4:
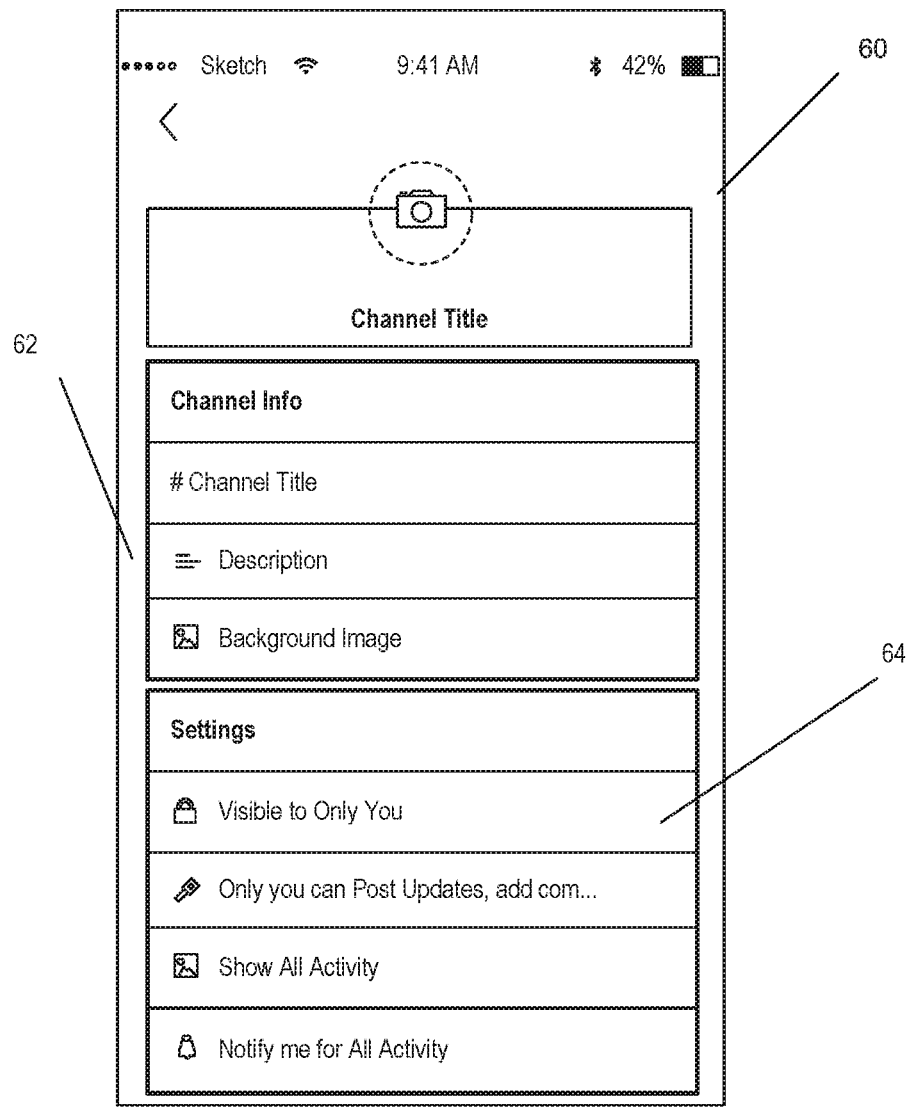
FIG. 4 is an illustration of a channel creation interface.

FIG. 4 is an illustration of a channel creation interface 60. Channels provide the application a method to categorize and restrict access to content fences. Creation of channels includes background information 62 for the channel, such as the name, a mission purpose, graphics, and other general details. Channels additionally include privacy settings 64 wherein the creating user designates the channel as public or restricted to certain users, such as friends, or a subset of friends. Users are enabled to invite other users to channels directly. Users within a channel are enabled to direct message one another with messaging functions.

Channels are associated with one or more content fences 42. Examples where a channel is connected to a single content fence 42 include: where a mobile food truck creates a channel with a mobile content fence 42 pertaining to that food truck and centers the content fence on the food truck and projects a virtual radius around the food truck through the application; where a number of friends create a single meeting location and generate a content fence 42 around that location; and where the community creates a fully public content fence 42 around a monument or tourist attraction such as the Golden Gate Bridge.

Examples where a channel is connected to multiple content fences 42 include: where a user places an interest in obtaining certain items from a grocery store, and content fences are placed around grocery stores; where a popular artist paints murals all around a city, and content fences 42 are placed around all of the murals; and where a parent generates content fences 42 as zones where a child is expected to be. These examples are not exhaustive, but are intended to provide illustration as to the uses of content fences 42.

Notifications for content fences 42 are categorized into style. Such as active notifications which externally notify the user of the mobile device when changes to the content fence occur in a manner similar to an incoming SMS, MMS, or e-mail message. Alternatively there are passive notifications which only alert the user once the client application software is activated. Kinds of events a user is notified of include when a member of the channel enters or leaves the content fence 42 or when content posts are added to the content fence 42.

Figure 5:
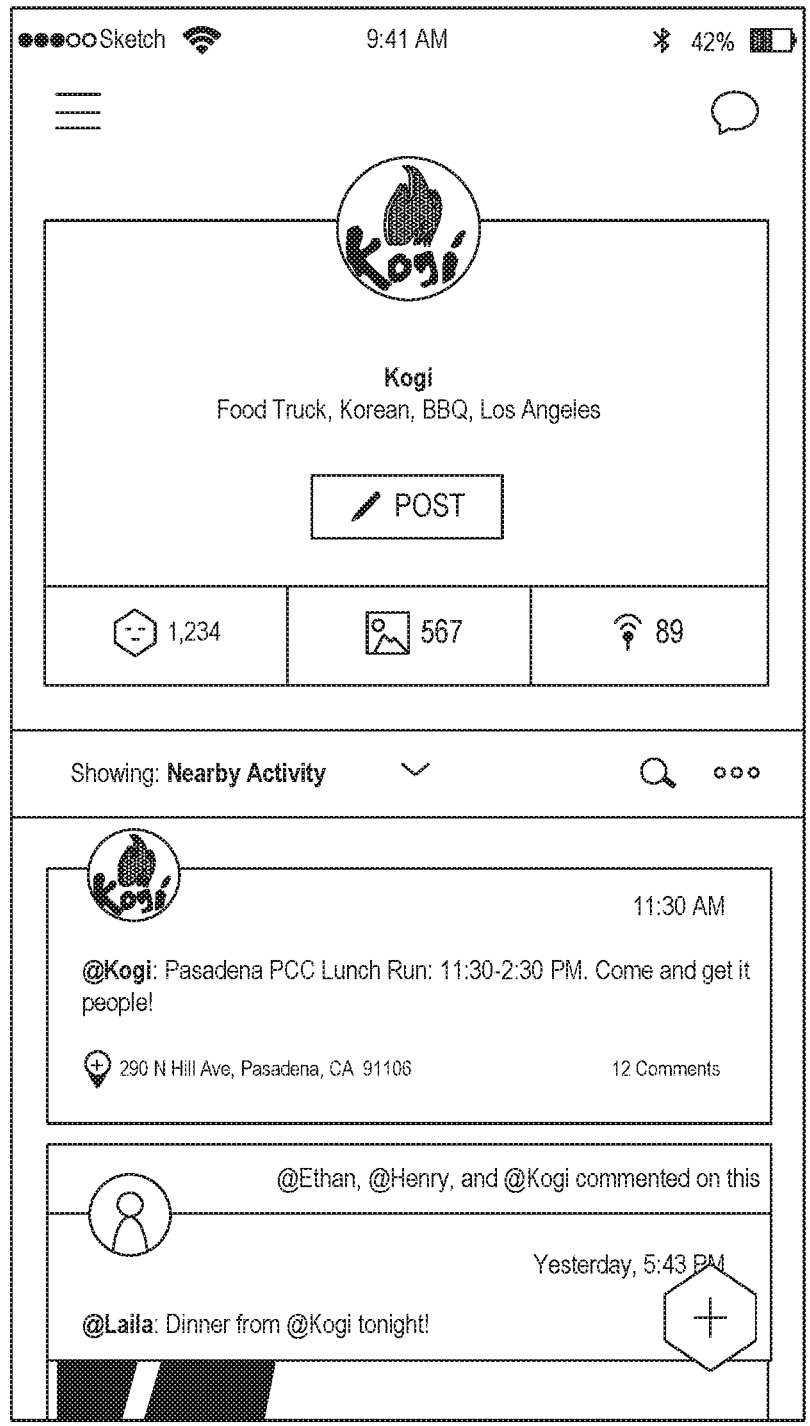
FIG. 5 is an illustration of a content feed associated with a particular channel with an adjustable content fence.

FIG. 5 is an illustration of a content feed 48 associated with a particular channel with an adjustable content fence 42. Displayed is a particular channel with a single content fence 42 associated with a food truck. In this case, the content fence 42 follows the food truck. In this case because the content fence is more likely to move than those around it, alerts are sent to those users who are in the food truck's channel, when the content fence 42 is brought to those users (rather than the users entering the circle or arbitrary polygon).

Figure 6:
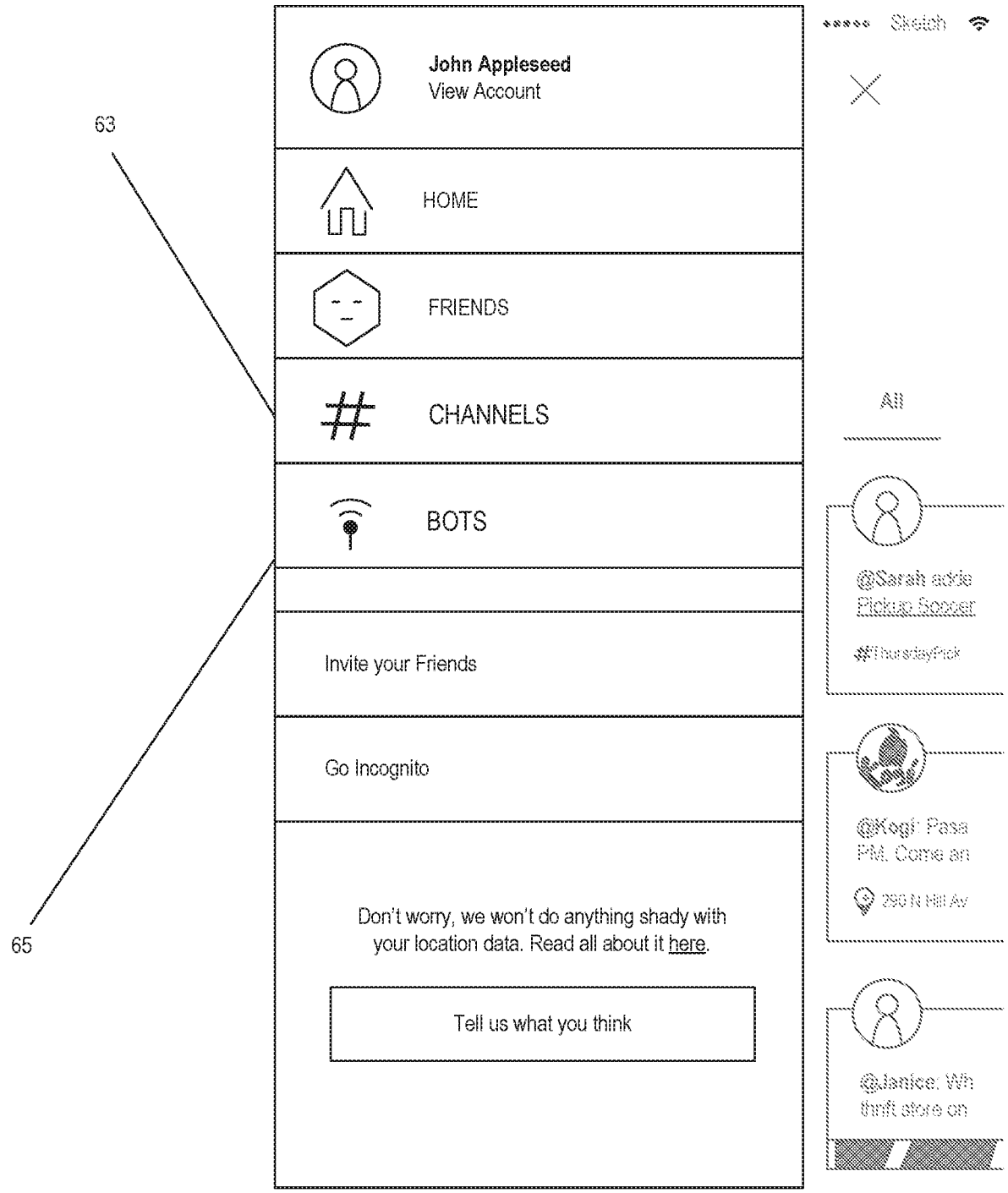
FIG. 6 is an illustration of a menu screen.

FIG. 6 is an illustration of a menu screen. Users on their respective mobile devices 24 access the menu screen from the client application software 38. There are options to search for channels 63 and search for content fences 65.

Figure 7:
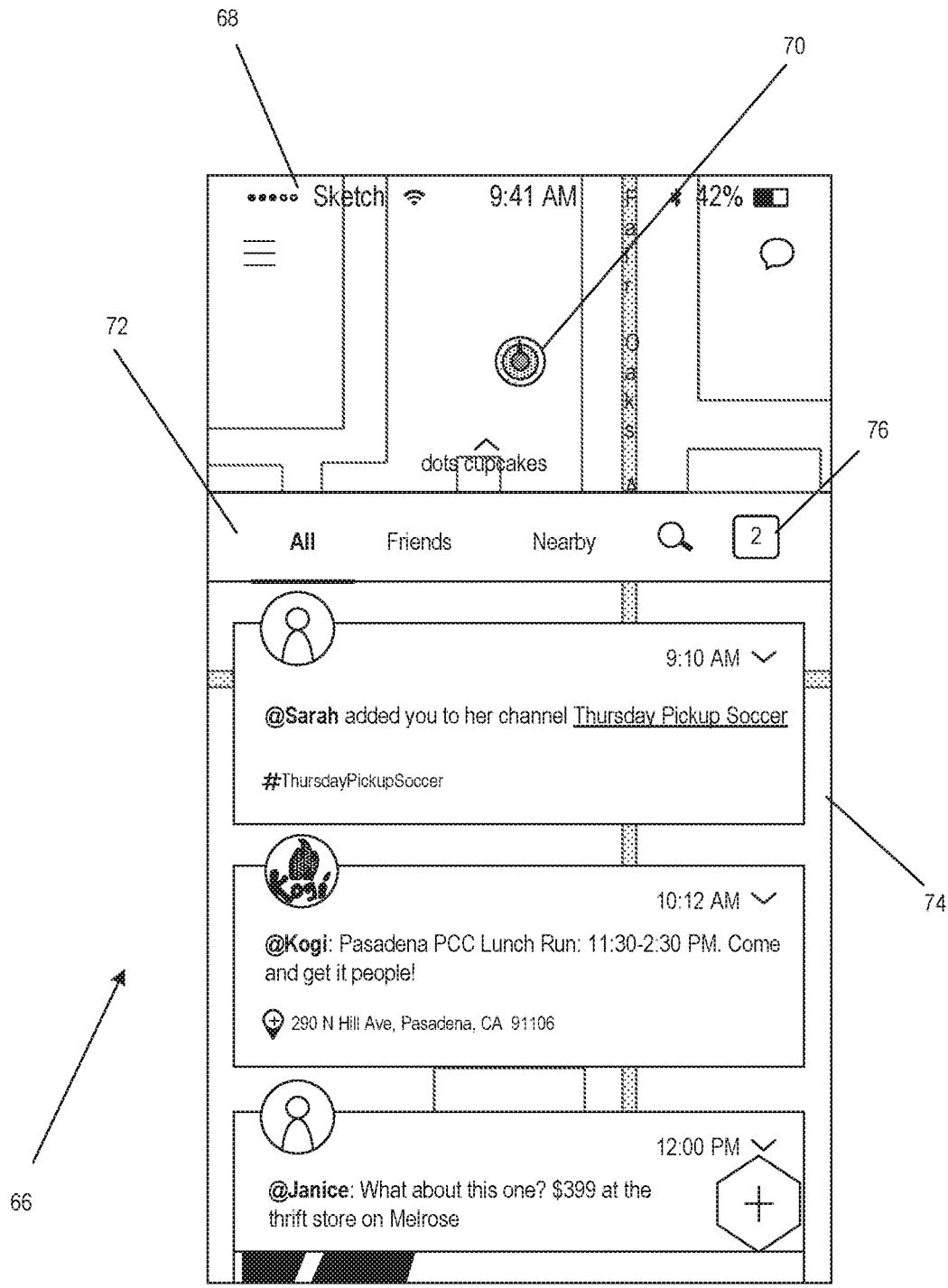
FIG. 7 is an illustration of a content fence suggestion feed.

FIG. 7 is an illustration of a content fence suggestion feed 66. In order to join channels, and find content fences 42 of interest to users, the application software 38 includes a suggestion feed 66. The suggestion feed 66 includes a current local map 68 as well as the user's location 70 (as determined by the location of their mobile device). The suggestion feed 66 includes suggestion filters 72 that sort and filter the suggested content in the suggestion feed 66. Suggested content are content posts 74 associated with content fences 42 that are public or available to the user for other reasons (ex: the user is friends with a user who has created a channel or content fence that is shared with friends). The filters enable a user to see content posts 42 for available content fences 42 the user's friends are posting in, all public content fences 42 and channels close to the user's current location 70, a combination of the above, or search for particular channels/content fences.

In some embodiments, the suggestion feed 66 provides suggested channels or content fences 42 to users based on a user's stated interests which are included in a user's account information stored in the server application software 26 and supplied through the client application software 38. Stated interests, or "tags" which are shared between channels/content fences 42 and the user's account information aid the suggestion feed 66 in directing users to particular channels and content fences 42 which the user may want to join. The user interface further includes a notification reminder 76 for accessing notifications from crossing content fence boundaries, or when content posts 54 are added to content fences 2 that a given user is following.

Examples of means to track a user's stated interests include content that the user has upvoted, content that the user has spent the most time viewing, or content that the user shares with others.

Examples of uses of the application software follow:

A group of friends create a channel and assign content fence to a coffee shop. The content fence is given settings to notify all channel users when any other channel user enters the content fence. This way each user know when the others are arriving to meet one another.

The application software includes a public content fence around the golden gate bridge which is available for anyone to add content posts of pictures around the bridge, check in, or posts stories about the bridge. Unrelated posts are voted down and disappear. The content fence becomes a cloud repository for society's experience of the golden gate bridge.

A parent sets up a channel for their family, and creates a number of content fences for locations the parent expects the child to be. When the child arrives at or leaves from one of the content fences, the parent is provided with a notification.

A group of friends create a channel and assign content fences around each other. When the friend's content fences intersect, those friends are sent notifications.

A user generates a private content fence centered around "grocery stores" and populates the content fence with a grocery list. When the user enters a content fence around a grocery store, identified via the map software, the user is provided with a notification and presented with the grocery list that user wrote.

A pizza delivery service has a public channel which users can join, and content fences are placed around the pizza drivers. When the drivers approach the user who ordered the pizza, the user is notified that their pizza is nearly there and to expect someone at the door shortly.

Figure 8:
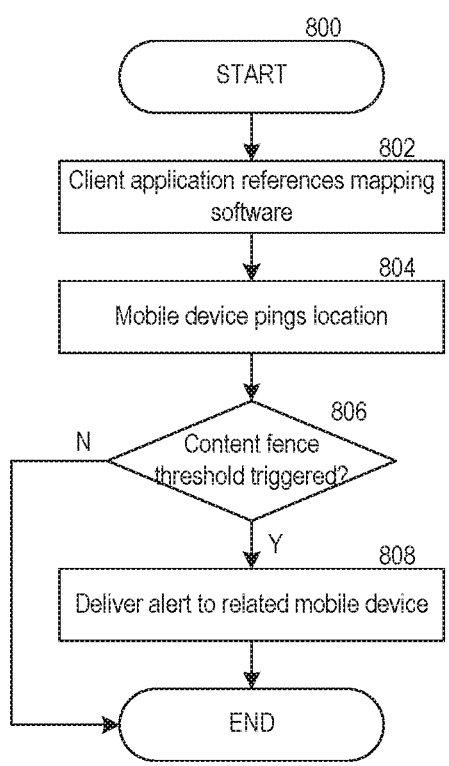
FIG. 8 is a flowchart illustrating content fence thresholds.

FIG. 8 is a flowchart illustrating content fence thresholds. In step 802, the client application references mapping software to obtain maps and map data. In step 804, the mobile device determines its location. This occurs through the use of GPS, or triangulation using cellular networks, or other suitable wireless networks known in the art for location mapping. In step 806, the application software determines whether or not a content fence perimeter has been crossed. If a perimeter crossing has occurred, then the application software delivers an alert to a related mobile device. depending on the settings of the content fence or channel associated therewith, the device which receives the alert may not be the same device which triggered it.

Figure 9:
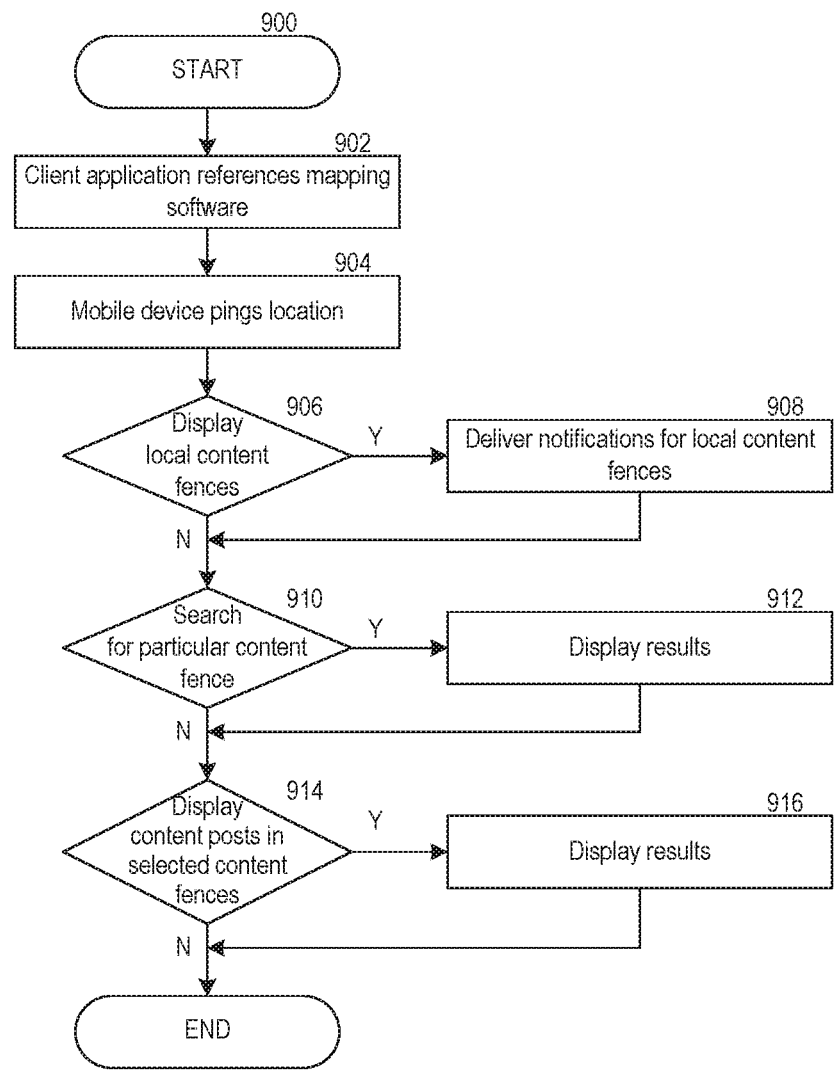
FIG. 9 is a flowchart for managing a content fence feed.

FIG. 9 is a flowchart for managing a content fence feed. In step 902, the client application references mapping software to obtain maps and map data. In step 904, the mobile device determines its location. In step 906, the client software determines whether or not to display local content fences. This determination is made based on selected interface screens and settings within the application. If the local content fences are displayed, in step 908, notifications for the local content fences are forwarded to the content feed.

In step 910, the client application software waits to receive a request to search for a particular content fence. If that request is received, in step 912, the client application receives from the server application search results to display the searched content fences. In step 914, the client application software waits receive a request to activate of select a content fence in order to display the content posts therein. In step 916, if the activation command is received, the client application software receives from the server application the content post data of the activated content fence.

Figure 10:
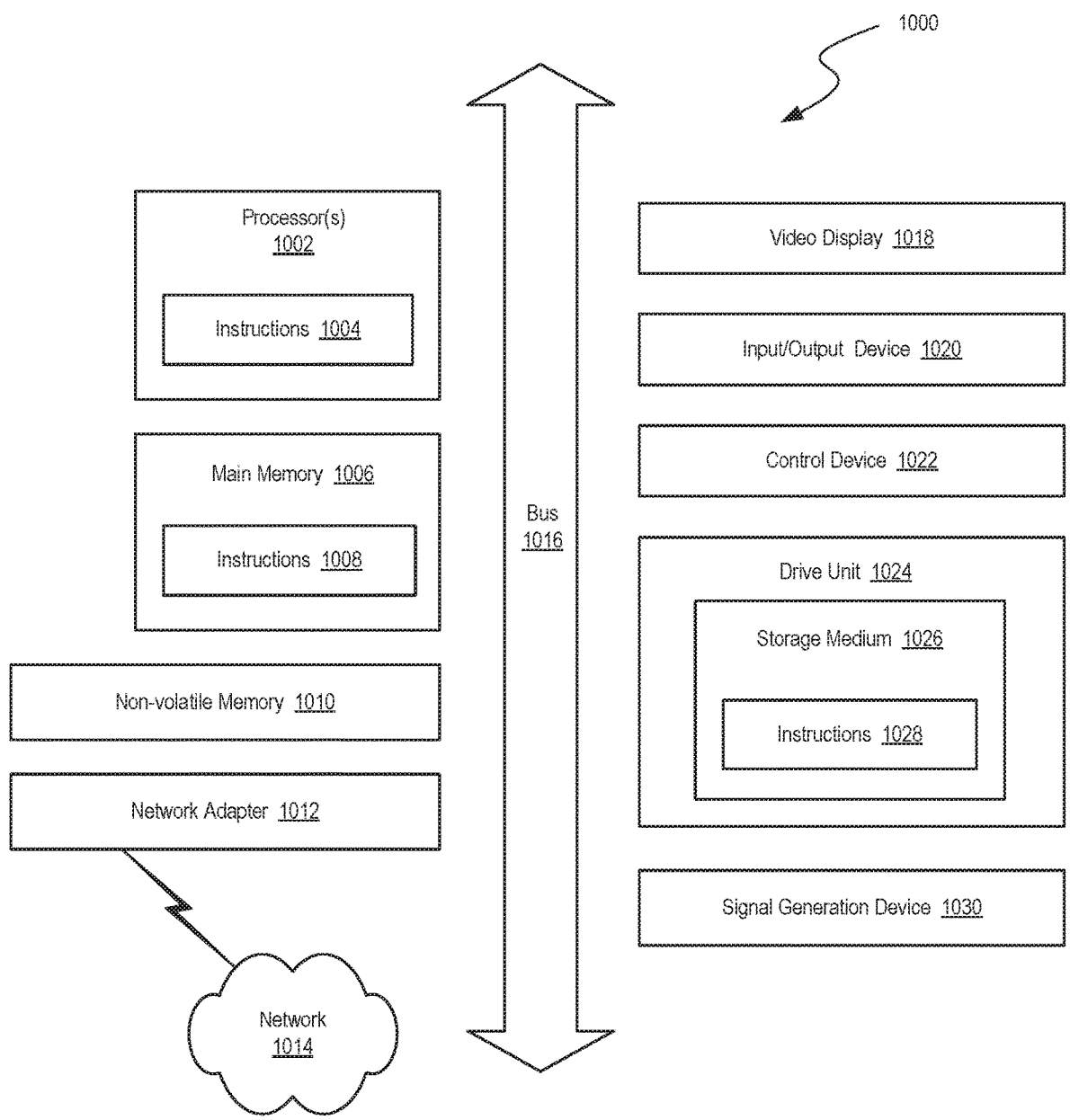
FIG. 10 is a block diagram illustrating an example of a computing system 1800 in which at least some operations described herein can be implemented.

FIG. 10 is a block diagram illustrating an example of a computing system 1800 in which at least some operations described herein can be implemented. The computing system may include one or more central processing units ("processors") 1802, main memory 1806, non-volatile memory 1810, network adapter 1012 (e.g., network interfaces), video display 1818, input/output devices 1820, control device 1822 (e.g., keyboard and pointing devices), drive unit 1024 including a storage medium 1826, and signal generation device 1830 that are communicatively connected to a bus 1816. The bus 1816 is illustrated as an abstraction that represents any one or more separate physical buses, point to point connections, or both connected by appropriate bridges, adapters, or controllers. The bus 1816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the computing system 1800 operates as a standalone device, although the computing system 1800 may be connected (e.g., wired or wirelessly) to other machines. In a networked deployment, the computing system 1800 may operate in the capacity of a server or a client machine in a client-server network environment, or as a peer machine in a peer-to-peer (or distributed) network environment.

The computing system 1800 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 1006, non-volatile memory 1010, and storage medium 1026 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 1028. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 1004, 1008, 1028) set at various times in various memory and storage devices in a computer, and that, when read and executed by one or more processing units or processors 1802, cause the computing system 1000 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 1010, floppy and other removable disks, hard disk drives, optical disks (e.g., Compact Disk Read-Only Memory (CD ROMS), Digital Versatile Disks, (DVDs)), and transmission type media such as digital and analog communication links.

The network adapter 1012 enables the computing system 1800 to mediate data in a network 1014 with an entity that is external to the computing device 1000, through any known and/or convenient communications protocol supported by the computing system 1000 and the external entity. The network adapter 1012 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1012 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can include, but are not limited to, intrusion-prevention, intrusion detection, next-generation firewall, personal firewall, etc.

The techniques introduced herein can be embodied as special-purpose hardware (e.g., circuitry), or as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disk read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method comprising:
   receiving, by a web server, specifications for a content fence from a client application executed on a user device, the specifications including a location with respect to a geographical map, a shape, and a social channel, the shape creates a set of geographical bounds around the location;

storing, in a database, the content fence;

monitoring, by the web server, a device location of a first tracked device associated with a first user, and the first tracked device executing the client application and subscribed to the social channel;

determining, by the web server, that the device location of the first tracked device has crossed over the set of geographical bounds; and in response to said determining, transmitting, by the web server, a notification to a second device, the notification related to the first device crossing the set of geographical bounds, wherein the second device is operated by a second user and subscribed to the social channel.

2. The method of claim 1, wherein the first tracked device is the user device.

3. The method of claim 1, wherein the notification is any of:
an SMS message;
a MMS message; or
a client application notification.

4. The method of claim 1, further comprising:
receiving, by a web server, a multimedia file from an authorized user device, the multimedia file flagged by the authorized user device as having an association with the content fence; and
hosting, by the web server, the multimedia file as accessible through the client application and indexed by the content fence.

5. The method of claim 4, further comprising:
receiving, by a web server, a content tag from the authorized user device, the content tag associated with the content fence; and
indexing, by the database, the content fence by the content tag.

6. The method of claim 5, further comprising:
receiving, by the database, a search request from the user device, the search request including the content tag; and
returning results, by the database, the results including the content fence, and a plurality of other content fences that are indexed by the content tag.

7. The method of claim 1, further comprising:
In response to a communication from the client application as executed by the user device, shifting, by the web server, the location of the content fence with respect to the geographical map.

8. The method of claim 7, wherein said communication from the client application as executed by the user device is sent in response to the user device physically moving, and said shifting the location shifts the location to a new location corresponding to the physical location of the user device.

9. The method of claim 8, further comprising:
receiving, by a web server, specifications for a second content fence from the client application executed on the first tracked device, the specifications including a second location with respect to the geographical map, a second shape, the second shape creates a second set of geographical bounds around the second location;
storing, in the database, the second content fence;
monitoring, by the web server, a new location of the content fence with respect to the second content fence located at the second location;

determining, by the web server, that the set of geographical bounds has intersected the second set of geographical bounds; and
transmitting, by the web server, a notification to the user device.

10. The method of claim 1, further comprising:
transmitting, by the web server, a client application notification to the user device.

11. A method comprising:
communicating, by a first client application executing on a first user device, to a web server, specifications for a content fence, the specifications including a location with respect to a geographical map, a shape, and a first identified user, the shape creates a set of geographical bounds around the location;
continuously updating the location of the content fence to match a location of the first user device associated with a first monitored user;
reporting device location, by a second client application executing on a second user device, to the web server, the device location is of the second user device and associated with the first identified user;
rendering, by the second client application on a display of the second user device, the content fence overlaid on the geographical map; and
in response to the second user device being located inside the set of geographical bounds, receiving, by the second user device, a notification from the web server, the notification related to the location first device causing the updates of the set of geographical bounds to cross over the second device, wherein the first user device and the second user device have each indicated to the web server an opt-in to a shared communication channel.

12. The method of claim 11, wherein the notification is any of:
an SMS message;
a MMS message; or
a client application notification.

13. The method of claim 11, further comprising:
uploading, by the second client application, a multimedia file to the web server, the multimedia file flagged as having an association with the content fence; and
in response to receiving user input selecting the content fence in an instance of the client application, rendering, by the instance of the client application, the multimedia file.

14. The method of claim 13, further comprising:
communicating, by the second client application, a content tag associated with the content fence;
communicating a search request, by the instance of the client application, for content fences as identified by a tag; and
receiving, by the instance of the client application, search results including a plurality of content fences including the tag.

15. The method of claim 11:
transmitting, by the first client application, a textual message to the web server; and
while the second user device is located inside the set of geographical bounds, receiving, by the second client application, the textual message.

16. A system comprising:
a client application instanced on a plurality of user devices;
a web server configured to receive specifications for a content fence from the client application executed on a first user device of the plurality of user devices, the specifications including a location with respect to a geographical map, a shape, and a social channel, the shape creates a set of geographical bounds around the location, the web server further configured to monitor a device location of a second user device of the plurality of user devices, the second user device associated with a monitored user and subscribed to the social channel, the web server configured to transmit a notification to user devices similarly subscribed to the social channel other than the second user device in response to the device location of the second device being located within the set of geographical bounds, the user devices other than the second user device associated with users other than the monitored user; and a database configured to store and index the content fence.

17. The system of claim 16, wherein the notification is any of:

an SMS message;
a MMS message; or
a client application notification.

18. The system of claim 16, wherein the client application is further configured to upload a multimedia file, wherein the multimedia file has an association with the content fence, and wherein the database is further configured to host the multimedia file as indexed by the content fence.

19. The system of claim 18, wherein the client application is further configured to submit a content tag to the web server as associated with the content fence, and wherein the database is further configured to index the content fence by the content tag.

20. The system of claim 16, wherein the web server is further configured to shift the location of the content fence to a new location with respect to the geographical map in response to a communication from the client application as executed by the first user device.

21. The system of claim 20, wherein said communication from the client application as executed by the first user device is sent in response to the first user device physically moving, and said shifting the location shifts the location to a new location corresponding to the physical location of the user device.

22. The method of claim 1, where association with the social channel is opt in.

23. The method of claim 1, wherein location data for the first tracked device is not displayed to the second device while the first tracked device is outside the set of geographical bounds.

* * * * *